United States Patent [19]
Nahidipour et al.

[11] Patent Number: 5,938,743
[45] Date of Patent: Aug. 17, 1999

[54] METHOD OF USING THE UNIX PHYSIO TO ALLOW DATA TO BE TRANSFERRED ON A PLURALITY OF CHANNELS CONCURRENTLY

[75] Inventors: Aram Nahidipour, Rancho Palos Verdes; Juan A. Romano, North Hills; Frederic J. Stann, Moorpark, all of Calif.

[73] Assignee: Xerox Corporation, Stamford, Conn.

[21] Appl. No.: 08/819,534

[22] Filed: Mar. 17, 1997

[51] Int. Cl.$^6$ .............................. G06F 13/00; G06F 13/14
[52] U.S. Cl. ................................... 710/22; 710/20; 714/11
[58] Field of Search .................................... 395/821, 842, 395/706, 182.09, 840; 710/1, 22, 20; 714/11

[56] References Cited

U.S. PATENT DOCUMENTS 5,179,666  1/1993  Rimmer et al. ........................ 395/275
5,251,322  10/1993  Doyle et al. ............................. 395/800
5,289,581  2/1994  Berenguel et al. ..................... 395/275
5,481,706  1/1996  Peek ........................................ 395/650
5,758,182  5/1998  Rosenthal et al. ...................... 395/823

Primary Examiner—Thomas C. Lee
Assistant Examiner—Rehana Perveen
Attorney, Agent, or Firm—Robert Cunha

[57] ABSTRACT

In the UNIX Operating System, modifying the kernel routine Physio, to enable a single system call to set up a number of concurrent direct memory access (DMA) channels between memory and the data buffers of a device. Many character device drivers use the UNIX Physio facility for I/O. The traditional implementation of Physio handles I/O in a serial manner by performing gather-write or scatter-read operations. This invention is an enhancement to Physio to support parallel I/O operations.

4 Claims, 1 Drawing Sheet

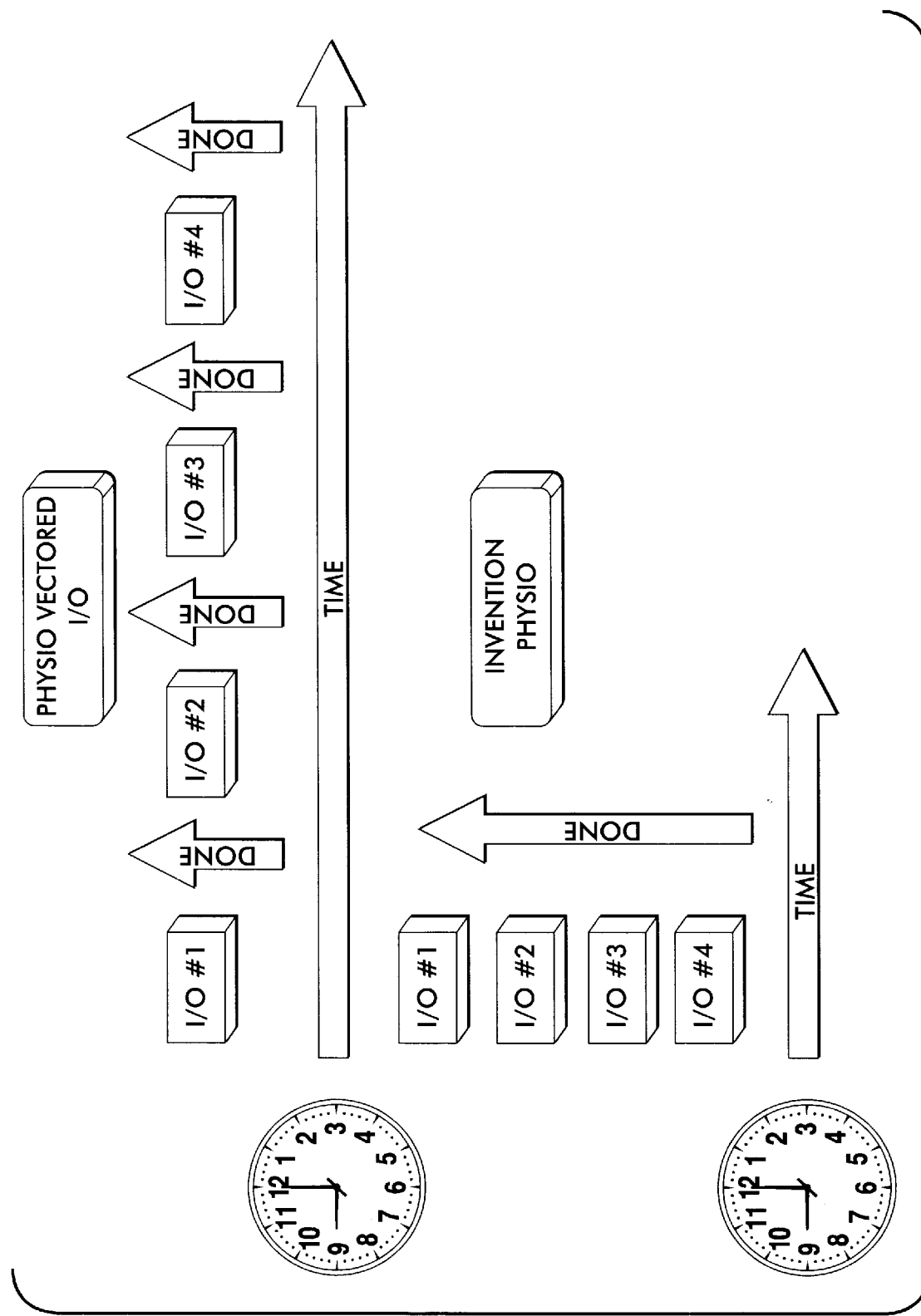

METHOD OF USING THE UNIX PHYSIO TO ALLOW DATA TO BE TRANSFERRED ON A PLURALITY OF CHANNELS CONCURRENTLY

BACKGROUND OF THE INVENTION

In the UNIX Operating System, modifying the kernel routine Physio, to enable a single system call to set up a number of concurrent direct memory access (DMA) channels between memory and the data buffers of a device.

Many character device drivers use the UNIX Physio facility for I/O. The traditional implementation of Physio handles I/O in a serial manner by performing gather-write or scatter-read operations. Physio performs this task by calling the Strategy routine of the device driver as many times as the number of data buffers. The net result is that each buffer transfer is done one after the another, serially.

I/O device drivers utilize a kernel routine called Physio. Physio ensures that the user's buffer(s) and the virtual memory mapping information (Page Table Entries) associated with the buffer(s) are all locked into physical memory. Locked means not available for swapping out of physical memory. This "frozen state" is necessary for two reasons: DMA controllers cannot resolve page faults, and the process which initiates the I/O typically blocks (and its pages become candidates for reuse). Physio calls the routine As_fault to guarantee that memory and PTEs are locked. This is the same routine called by the trap handler when a page fault occurs. The "as" in As_fault refers to the address space structure associated with a process address space. As_fault figures out from the virtual address which segment of the process contains the address, and then calls a segment specific routine, which loops over the address range a page at a time calling lower level subroutines which lock the memory and the PTEs (mapping information).

Physio provides several other capabilities. One of the parameters to Physio is a pointer to a routine that calculates the largest possible I/O given the constraints of the DMA hardware. If the size returned by this routine is smaller than the requested I/O size, Physio will break the I/O into smaller chunks that don't violate the constraint. Another function supported by Physio is "scatter-gather" I/O. If the user's data-buffer consists of multiple buffers that are in discontiguous virtual memory, the user can pass the driver a "vector" of structures each of which describes a piece of the total I/O requested. Physio will then process each of these buffers in turn. Physio also provides the mechanism by which the thread of control that does the read or write is put to sleep as the I/O starts and reawakened when the I/O completes. When Physio calls AS_fault and then queues the I/O request to the hardware via the driver's strategy routine, Physio sleeps, which means that the requesting thread sleeps. Physio is reawakened by the driver's interrupt service routine when the entire I/O, some part of a vectored I/O, or some part of a partitioned I/O (due to size constraints) completes.

The existing implementation is adequate for hardware devices that have a single I/O channel or are incapable of handling parallel I/O transfers. When more advanced hardware devices with multiple I/O channels are used, the serial behavior of Physio becomes a limiting factor when attempting to parallelize their throughput.

Concurrent real time applications have a problem using physio because multiple I/O channels are set up serially. In a real time system, where multiple channels are required in parallel to provide data at the proper moment, the synchronization of data access becomes difficult. This invention is an enhancement to Physio to support parallel I/O operations for devices capable of or requiring a parallel data transfer, and consists of four new system calls to be added to the original Physio kernel to implement this new capability. The figure on the next page (FIG. 1) captures the essential improvement provided by the invention.

SUMMARY OF THE INVENTION

The demands of modern computing on I/O bandwidth are considerable. Soon, computing platforms will be measured by their I/O capability instead of their processing capability. For example, in full color printing applications, the quality associated with image processing in its many forms is contingent on parameters that explode exponentially (pixels/inch). High speed digital printers and custom data base applications employ "disk farms" wherein files are "striped" across multiple disks to allow for high speed access.

FIG. 1 demonstrates the essential difference between existing functionality of the UNIX physio routine and the performance improvement provided by the invention. Confronted with multiple I/Os, traditional physio processes each I/O in a serialize fashion. The invention physio initiates all of the I/O concurrently, thus rendering a performance improvement (in this case a 4× improvement).

State of the art coprocessors and DMA engines that support these facilities are being designed with multiple channels to allow for the parallelism required to overcome bandwidth constraints associated with a single channel.

The challenge to support parallelism in application code has been met by the introduction of multi-threaded libraries and kernel support for "light weight" processes. Unfortunately, the engineers that developed the Unix device drivers for multi-channeled hardware face difficulties which have not as yet been addressed by operating system (OS) vendors.

If an application wishes to do a parallel read or write operation that includes multiple user buffers, he can either do a vectored I/O (as described above) or spawn multiple threads, each of which does a piece of the I/O. The vectored I/O appears more convenient; the overhead of creating or triggering multiple threads is avoided, and the I/O support provided by the OS looks pleasingly transparent to the application. The problem with vectored I/O in Unix is that it is processed serially by Physio. The assumption with scatter-gather I/O is that the pieces are being processed sequentially. For example, assume a device that has multiple input channels and requires data to be delivered to all these channels concurrently. A character device driver for such a device must overcome a number of obstacles imposed by existing Unix I/O support. We will illustrate approaches that can be taken to the solution of this problem. One based on existing I/O support in UNIX and the next one based on an extension to the Physio kernel functionality.

One way to overcome the problem of parallel I/O transfer in the existing UNIX system is to use multiple writes. The application must call a write system call or Aiowrite into the device driver for each parallel I/O stream. Issuing a write for each input stream, a different thread is required for each write because all the input I/O streams must be active concurrently and each write will block in Physio. Once Physio locks the user buffer in memory and calls Strategy for a given buffer, it blocks, waiting for the I/O to complete. Aiowrite is similar to the write case except writes will not block in the application.

This approach presents several complications: application and device driver synchronization and error handling. The threads must be managed (synchronized) so that the threads, consisting on one write call for each input stream, for each I/O transfer, do not stumble onto one another. The device driver needs a way to recognize which write call goes with which hardware input channel. A third complication is that the driver must know when it has received all the writes required for a complete parallel I/O transfer so that it can kick the hardware to start the I/O. Further complications arise if one of the writes fails before all the writes have come in for a given I/O; the driver must wait for the rest of the writes to come in to the driver and return error for all of them, or, if a write fails after the I/O's have been started, the driver must stop the DMA engine(s) for all the streams in progress. In other words, the device driver faces the task of keeping track, at all times, of all of the writes and reads associated with an I/O.

The first problem, that of thread synchronization, can be solved by using prioritized threads to avoid contention between sets of writes. In other words, two writes for the same hardware input channel must be sent in the correct I/O order. Other ways to solve this problem include a blocking Ioctl which unblocks once the driver has received a set of write/read calls for a given I/O. The application would then be free to send the next set of calls.

The second problem, namely that of associating each call with a corresponding hardware input/output channel can be solved by creating and assigning a minor node to each input channel. Thus, each write will be made to a different minor node. This requires an open call to each minor node before we can do a write/read to it. Now, both the driver and the application have to deal with multiple (sub)devices. The device driver can use the minor node to recognize each write/read call's association with an input/output channel. One caveat of this multiple minor node design is that all minor nodes must have access to the device's unit structure. Two ways to implement this would be for each minor node to have its own unit structure containing a reference to a common shared unit structure, or, encode the minor number of the main node (which has the main—common—unit structure) in the minor number of each minor node, through the main minor number. Each minor node then can get access to the main node's unit structure.

The third problem, that of the driver knowing when it has received all the calls for a given I/O, is also addressed by the solution to the previous problem. The driver must keep track of the writes/reads to each minor node, and start the I/O when it has a complete set of calls. The problem of the device driver having to wait for all the calls to come in for a given set regardless of whether any of them fail, is just inherent in this paradigm (synchronized multiple calls for a single I/O) and illustrates some of the inefficiencies of this concurrent data streams model which requires the driver to wait for all calls for a given I/O before it can act on any one of them.

In summary, this kind of I/O device seems to stretch the limits of the I/O subsystem in UNIX and the solution outlined above presents several disadvantages:

The application code is more complicated having to synchronize N threads, and to deal with N devices (minor nodes). The device driver is much more complex and inefficient. A minimum of N+1 threads are needed if we can afford to wait until the first set of N returns to issue a new set of calls for the next I/O. If, however, there are real time constraints, there has to be a second set of N threads active to issue the next I/O before the previous one finishes, 2N+1 becomes the minimum number of threads required. This requires more kernel memory for the structures associated with threads, LWP's, etc and there is more overhead associated with scheduling and context switching. This approach does not scale well. The above mentioned drawbacks could get worse if N (number of channels) increases.

The following is a pseudo code for driver and application using write.

```
dev_attach( )
{
    /* Create X minor nodes per parallel I/O. To do this we have
    * to create unit structures for ALL. In the unit structure
    * there is a pointer to the common unit structure. So, for
    * the minor nodes to get to the common unit structure from
    * open( ), close( ), write( ), etc., they first get to their own
    * unit structure thru their minor number, and then they look up
    * the pointer to the common unit structure.
    * NOTE: This can also be done by encoding the main minor number
    * in the minor number for the input/output stream nodes without
    * the need for individual unit structures for every minor node.
    /*
    Get the instance number;
    Allocate the main unit structure
    common_unit_struct = get common_unit_struct( );
    Initialize unit_struct
    Create main minor node
    /* Create minor nodes (one per I/O channel).
    * Here, a minor node is created for each channel
    * and its corresponding unit structure is allocated.
    * Also, the pointer to the common unit structure
    * is saved in each node's unit structure.
    */
    for(i=0, j < number of channels; i++)
    create_minor_node( );
    /* create unit structs (one per I/O channel) */
    for(i=0; i < number of channels; i++)
    {
        Allocate unit_struct
        /* save common unit struct in each minor device's unit struct */
        channel_unit_struct = get_unit_struct( );
        minor_unit_struct->common_unit_struct =
        common_unit_struct;
    }
    do the rest of attach initialization
}
strategy( )
{
    Get minor node;
    Get unit struct for minor device;
    Get common unit struct from minor unit struct;
    Put write or read buffer header in the I/O queue
        for this minor device (channel);
    Increment write/read received_count(s);
    If (expected receive_count)
        setup and start DMA for the first buffer header
        on each channel's buffer queue;
    return;
}
```

Therefore, for reads and writes to the minor nodes, the device driver extracts the common unit struct from the minor node's unit struct and uses the minor numbers to identify which channel the write/read corresponds to via a predefined order.

In Strategy, after the minor number corresponding to the channel and the common unit struct are extracted, the write/read buffer(s) are queued until all the buffers needed for the current I/O transfer are in. Once all the calls for an I/O are in, strategy kicks the hardware to start multiple DMA streams.

Another way to implement parallel I/O transfer in the existing UNIX is taking advantage of the ioctl( ) system call. The device driver must support an ioctl( ) which performs all the tasks done by the kernel such as physio( ). This case is much simpler than the multiple writes. The best solution to this is to enhance the functionality of physio( ) to support both serial and parallel I/O.

BRIEF DESCRIPTION OF THE DRAWINGS

FIG. 1 demonstrates the essential difference between existing functionality of the UNIX physio routine and the performance improvement provided by the invention. Confronted with multiple I/Os, traditional physio processes each I/O in a serialized fashion. The invention physio initiates all of the I/O concurrently rendering a performance improvement.

DETAILED DESCRIPTION OF THE INVENTION

Parallel I/O Transfers with enhanced physio( )

A far better solution to this concurrent-data-streams I/O challenge is to have a system call such as writev but that unlike writev, handles all vectors in parallel. A forced path for any write or writev system call is physio. Physio, which is the key utility to lock down user buffers for DMA transfer, treats the vectors in writev serially, that is, it locks down a vector, then it calls strategy( ) which will start the I/O for that vector, and then it blocks waiting for the I/O to complete. When the first vector's I/O completes, the thread is awakened, unlocks that vector from memory, reuses the same buffer header and takes care of the next vector, and so on. The solution to this dilemma is to improve physio to take an array of vectors in a uio struct (as it now does for writev), lock them all in memory, then call strategy( ) (once), which will cause the hardware to start the I/O, and then block. When the I/O completes, all the vectors are unlocked and physio returns as it currently does.

There are some obvious advantages to this solution. First, it does away with the need for minor nodes, since now the writes come together in the form of an array of vectors in a uio struct. It also radically simplifies the synchronization problems, both in the driver and the application, that the first solution above presented.
Summarizing the benefits of using writev and an enhanced physio:

1. The application code is simpler, the need for N threads is down to 1 thread for every N I/O system calls required in the standard UNIX solution presented above making synchronization a much simpler task.

2. More efficient. Lower utilization of system resources. Since there are less threads, we can save Kernel resources. This include kernel memory and other tasks that the Kernel has to perform for each additional thread. Less overhead.

3. The driver code conforms to the traditional UNIX device driver interface, though the writev system call has been overloaded.

4. It scales well. The same code can now handle any device with multiple data streams (any N).
The disadvantages:

1. Overloading of writev. Writev cannot be used as a vector write and a parallel write in the same device driver.

The following pseudo code illustrates the two solutions to this parallel I/O problem.
Pseudo Code:

Using the parallel write scheme and enhanced physio, avoids some of the complications in the pseudo code shown above. A simpler implementation using parallel writes is illustrated below:

```
int
dev_attach( )
{
    Get the instance number;
    /* Allocate the unit structure */
    unit_struct = get_unit_struct( );
    Initialize unit_struct
    Create minor node
    Do the rest of attach's initialization
}
strategy( )
{
    Get instance number;
    Get unit struct for device;
    /* Strategy gets a linked list of write or read buffer headers */
    Setup and start DMA on each buffer in the linked list;
    return;
}
```
6. implementation detail
================================================
Standard physio( ):
```
int physio(int (*strategy)(struct buf *), struct buf *bp,
           dev_t dev, int rw_flag, void (*minphys)(struct buf *),
           struct uio *uio)
{
    if (bp = = NULL)
        allocate one;
vector_loop:
    if(error || end of i/o request) {
        free bp, if physio allocated it
        return;
    }
    /* Setup buffer for I/O */
    while(more data) {
        bp->b_flags = B_BUSY | B_PHYS | rw_flag;
        more buf set up
        (*minphys) (bp);
        lock down and fault-in user pages
        (*strategy)(bp);
        biowait(bp);
        unlock user pages
        update uio struct (uio_resid, uio_offset,
            iov_len, iov_base)
    }
    bp->b_flags &= (B_BUSY | B_WANTED | B_PHYS);
    goto vector_loop;
}
Enhanced physio( ):
int physio(int (*strategy)(struct buf *), struct buf *bp,
           dev_t dev, int rw_flag, void (*minphys)(struct buf *),
           struct uio *uio)
{
vector_loop:
    if (bp = = NULL)
        allocate one;
    if(error || end of i/o request) {
        free bp, if physio allocated it
        return;
    }
    /* Setup buffer for I/O */
    while(more data) {
        bp->b_flags = B_BUSY | B_PHYS | rw_flag;
        more buf set up
        (*minphys) (bp);
        lock down and fault-in user pages (bp)
        update bp count, resid and iov_len, iov_base
    }
    bp = bp->b_forw;
    goto vector_loop (next iovec)
    /* Now, call strategy with a linked list of bp's */
    (*strategy)(bp);
    biowait(bp);
vector_unloop:
    while(more data) {
        (*minphys) (bp);
        unlock user pages (bp)
        update bp count, resid and iov_len, iov_base
    }
    update uio struct (uio_resid, uio_offset)
    bp = bp->b_forw;
```

-continued

```
        goto vector_unloop (next iovec)
        bp->b_flags &=(B_BUSY | B_WANTED | B_PHYS);
        return;
}
------------------ App2 --------------
#include <sys/types.h>
#include <sys/stat.h>
#include <fcntl.h>
#include <thread.h>
#include <unistd.h>
const int     NUM_PARALLEL_CHANEL = 4;
const int     BUFSIZE = 1024;
int           fd[NUM_PARALLEL_CHANEL];
char          buff[NUM_PARALLEL_CHANEL][BUFSIZE];
main( )
{
        int    i;
        char   tmp[100];
        for (i = 0; i<NUM_PARALLEL_CHANEL; i++) {
                sprintf(tmp, "/dev/pdev_min%d", i);
                if ((fd[i] = open(tmp, O_RDWR)) <= 0)
                        exit(1);
        }
        for (i = 0; i < channel_size; i++) {
                if (thr_create(NULL, ( ), do_write_channel, &buff[i],
                        THR_BOUND, NULL) != 0)
        {
                printf("Created write Thread #%d FAILED !\n", i);
                exit(-1);
                }
        }
        return 0;
}
do_write_channel(void *arg)
{
        int     *id = (int *) arg;
        write(fd[*id], buff[NUM_PARALLEL_CHANEL], BUFSIZE);
        return;
}
---------------------------- end ---------------------------------------
-------------------- App 6 -----------------------------
#include <sys/types.h>
#include <sys/stat.h>
#include <fcntl.h>
#include <thread.h>
#include <unistd.h>
const int     NUM_PARALLEL_CHANEL=4;
const int     BUFSIZE=1024;
int           fd;
char          buff[NUM_PARALLEL_CHANEL][BUFSIZE];
main( )
{
        int    i;
        char   tmp[100];
        if ((fd = open(tmp, O_RDWR)) <= 0)
                exit(1);
        writep(fd, buff, NUM_PARALLEL_CHANEL, BUFSIZE);
        return 0;
}
-------------------------- end -----------------------------
```

This model can be taken one step further to support a set of parallel system calls such as parallel write and read (writep and readp), to avoid overloading the current writev/readv calls, and parallel vectored write and read (writepv, readpv). The vectored version would support scatter-gather on each parallel input/output stream all in a single system call.

```
Adding writep( ), readp( ), writepv( ) and readpv( )
        #include <sys/types.h>
        #include <sys/uio.h>
        int writep(fd, iop, iopcnt)
        int fd;
        struct iovec *iop;
        int iopcnt;
```

```
        int writepv(fd, iopv, iopvcnt)
        int fd;
        struct iovec **iopv;
        int iovpcnt;
        int readp(fd, iop, iopcnt)
        int fd;
        struct iovec *iop;
        int iopcnt;
        int readpv(fd, iopv, iopvcnt)
        int fd;
        struct iovec **iopv;
        int iovpcnt;
```

This solution to real time parallel data transfer can have various applications. For example, a compression technique used by decomposers of Page Description Languages (PDL) is a segmentation-based compression which uses hints from the PDL to do the segmentation and compression. Based on the object, an appropriate compression is used. For example, text, graphics and images are different types of objects and are compressed with different algorithms. To decompress this type of compression, typically the hardware or software needs two or more data channels: one to provide information about the other channels and the others to contain the compressed data. If these channels are not interleaved, the hardware will need access to multiple data channels at the same time. When multiple DMA is needed at once, this means parallel physio is required to handle multiple DMA, concurrently.

This type of parallel DMA can also be used in other applications, such as data base, file system and networking. In a database, for example, one may want to access a record that is distributed onto multiple disks. To access this record, the operating system and device driver can use the parallel physio to access multiple disks at the same time. The advantage of using parallel physio will be enhanced performance, and simpler driver and application.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A system of enabling the transfer of data over DMA channels from a memory to a number of devices using the UNIX operating system comprising the steps of:
   changing the single channel of the UNIX system to a number of channels which are multiplexed between the number of devices and the memory, and for each channel,
   a. sending an instruction to the operating system from an application stating the number of data blocks, their size, and a pointer to the location of each data block,
   b. preparing the data blocks by locking all data blocks into memory, locking all data blocks page table entries (PTE) into memory, and generating pointers to the data blocks, and
   after the previous steps are completed, transferring the data blocks from the memory to the devices concurrently.

2. The system of claim 1 wherein, when transfer is complete, notifying the operating system of the completion of the data transfer, and
   sending a data transfer completion signal from the operating system to the application.

3. A system of enabling the transfer of data over DMA channels from a number of devices to a memory using the UNIX operating system comprising the steps of:

changing the single channel of the UNIX system to a number of channels which are multiplexed between the number of devices and the memory, and for each channel, a. sending an instruction to the operating system from an application stating the number of data blocks, their size, and a pointer to the location of each data block, b. preparing the data blocks by locking all data blocks into memory, locking all data blocks page table entries (PTE) into memory, and generating pointers to the data blocks, and after the previous steps are completed, transferring the data blocks from the device to the memory concurrently.

4. The system of claim 1 wherein, when transfer is complete, notifying the operating system of the completion of the data transfer, and sending a data transfer completion signal from the operating system to the application.

* * * * *